Jan. 2, 1968  R. F. WONNEMAN  3,360,844

APPLICATOR CLOSURE INSERTING MACHINE

Filed Sept. 20, 1965  3 Sheets-Sheet 1

INVENTOR.
ROMAN FRANCIS WONNEMAN

INVENTOR.
ROMAN FRANCIS WONNEMAN

Jan. 2, 1968   R. F. WONNEMAN   3,360,844
APPLICATOR CLOSURE INSERTING MACHINE
Filed Sept. 20, 1965   3 Sheets-Sheet 3

INVENTOR.
ROMAN FRANCIS WONNEMAN

United States Patent Office 3,360,844
Patented Jan. 2, 1968

3,360,844
APPLICATOR CLOSURE INSERTING MACHINE
Roman Francis Wonneman, Baltimore, Md., assignor to Theodore S. Miller, trustee for the benefit of creditors of Machinery Systems, Inc., Baltimore, Md., a body corporate of Maryland
Filed Sept. 20, 1965, Ser. No. 488,625
13 Claims. (Cl. 29—208)

This invention in general relates to apparatus for assembling individual closures to individual containers and more particularly to apparatus for placing cap portions of individual applicator type closure assemblies onto the openings of individual handleable containers after first directing dip member portions of such closure assemblies into the opening of said containers.

Closure assemblies of the types applicable to the present invention are in the general category of eye droppers, medicinal applicators, stem brush paste glue applicators, aerosol valves, and woven cloth wick air applicators. A closure in this category of closure assemblies generally comprises individually a closure cap having an axially projecting lower dip member part such as a rigid rod of glass or metal, or a flexible tube, or a pliable textile wick, or a brush at the extremity of a rod; and, in some instances axially projecting upper parts such as a compressible bag, or a rigid handle, or operating parts of a manually operable valve.

In packaging viscous products such as paste glue, liquid deodorants, an aerosols in containers to be temporarily sealed with applicator type closures, it is common practice with some manufacturers to use an individual self powered horizontally disposed endless belt conveyor at a lower extreme level above a floor level for receiving and transporting, in interrupted periods of motion, consecutive successions of lineally aligned upright partially filled containers in lineally spaced relation to each other, into and out of each one of a series of assembly stations at which a first manual operator inserts dip member portions into and cap portions of a closure assembly onto a container on the conveyor, whereupon a second manual operator centers said cap portions over the container opening after said container is moved from the first inserting station to come to rest at a second, or centering station, after which a third manual operator at a third, or pressure applying station, manually presses the closure cap to seat same on the container opening after the container is moved from the second station and comes to rest at said third station.

The foregoing individual conveyor is generally used by manufacturers for producing packaged products in small quantities. For large quantity production however, others use a pair of longitudinal side by side endless belt conveyors at a lower extreme level above a floor level with a common stationary conveyor plate for slidably supporting each one of the pair of said conveyors and common power drive means for moving each one of the pair of conveyors in unison for receiving transversely spaced apart like alignments of lineally spaced apart containers and transporting them in unison to, into, and out of transversely aligned pairs of aforesaid assembly stations for inserting, centering and pressing closures onto containers two at a time, by a proportionately higher number of manual operators.

For manually inserting a closure assembly into an individual container at each one of aforesaid inserting stations, it is common practice for a manual operator at said station to manually select an individual closure assembly from a random quantity thereof by grasping cap portions of the closure assembly and to then loosely hold same momentarily at rest at an extreme upper level above said container and to manually turn the closure assembly until extremity portions of its dip member dangle below at an upper mean level above said container on said conveyor and to then manually position said extremity over the container opening at said lower mean level, and to then follow this by manually imparting a start impelling force to said cap portions to force said dip tube extremity substantially into the container opening, whereupon the operator manually releases said cap portions to drop the closure assembly for completion of its initial assembly to the container by gravity.

In such practice, the closure cap is generally guided, in its descent by gravity to the container opening after it is dropped as aforesaid, by portions of its pendent dip member in sliding guiding relation to inside wall portions of the container opening, and in instances, particularly when the dip member is curved, said cap comes to rest on the container in axial misalignment with the container opening. In these instances the cap is centered and pressed onto the container in subsequent manual centering and pressure applying operations as previously stated. For manually assembling stem brush applicators to containers having small openings it is common practice for a manual operator to select an individual closure by grasping cap portions of the closure assembly and then to manually gather the brush bristles and compress same to a size appropriate for entry into the container opening, whereupon the closure assembly is manually positioned over the said container opening, with the closure cap grasped and the bristles compressed as aforesaid, and then the bristles are manually guided while being moved into said opening under the action of a start impelling force imparted to aforesaid cap by the operator. After brush portions of the closure assembly are substantially into the container opening, the operator manually releases the assembly to drop same for completion of its initial assembly to said container by gravity, and the aforesaid manual centering and pressure applying operations are accomplished in subsequent stations by other manual operators. The aforesaid manual practice is time consuming, tiresome for the operator and adds to the cost of the finished product.

It is therefore a principal object of the present invention to provide apparatus which mechanically performs the manual operations related to manually inserting, centering and pressing individual applicator type closures to individual containers on conveyors, and which is simple, efficient and facile to construct and operate.

Another object of the invention is to provide a generic system of parts and sequence of operation adaptable for operation with a single endless belt conveyor for inserting closures into containers one at a time or with multiple endless belt conveyors for inserting closures into containers one at a time or with multiple endless belt conveyors for inserting in unison a multiplicity of closures to an equal number of containers.

Further objects and details of the invention will be apparent from the description given hereinafter and in the accompanying drawings which illustrate a preferred best mode of embodiment of the present invention by way of example.

The invention essentially consists of a generic system of parts and sequence of operations for first receiving and loosely holding momentarily at rest the cap part of an applicator closure in a releasable holding receptacle with the closure dip member dangling freely beyond the receptacle in a direction towards the opening of an upright container at rest below said receptacle, for guidably moving extremity portions of said dip member in position to enter the opening of said container, for opening said receptacle to release said cap part, for imparting a starting impelling force to the closure cap after its release to send extremity portions of said dip member into the opening of said container and to send said cap from said receptacle in a direction towards said container, for initial assembly of an applicator closure to a container by accelerated gravity means.

In its present best mode and preferred form the invention is embodied by way of example in applicator closure inserting apparatus removably attached to the common frame support plate of a horizontally disposed self powered container conveyor having a pair of side by side endless belts longitudinally movable in unison on said plate and common power drive means for moving said belts in interrupted periods of motion, for operation of said inserting apparatus in spaced superposed relation to said belts to simultaneously insert each one of a pair of applicator closure assemblies into a container on each belt.

For this, the invention generally comprises a transversely spaced apart pair of stationary inserting units supported transversely above said pair of side by side endless belts for slidably receiving and momentarily holding at rest at an upper extreme level above said conveyor, cap portions of an individual closure assembly in each one of the pair of inserting units in position therein with the dip member of said closure assembly dangling below said inserting units with extremity portions of said dip member at an upper mean level in spaced above relation to a lower mean level at the level of the openings of containers on said conveyors, separate dip member guide means supported for movement in unison, at said upper extreme level, into guiding relation to the dip member dangling below a closure assembly in each one of aforesaid inserting units and into partially surrounding relationship with part of the dip member part of a next following closure in an alignment chute and for continuing movement downwardly along each said dip member to move the dip member extremities of closures held momentarily at rest in said holding receptacles in position to enter the opening of upright containers below each of said inserting units and at the same time, to move the dip member extremities of said following closure in said chute out of interfering relation to the path of travel of the cap part of closures to be released and sent from said receptacles to the openings of said containers for simultaneously inserting each one of a pair of closure assemblies into each one of a pair of upright containers while said containers are momentarily at rest.

In its broader aspects, the invention is embodied in its present best mode and preferred form as apparatus adapted to be attached to intermittently moving, or indexing endless belt conveyors, but is also operable for inserting applicator closures to containers on various other types and shapes of container conveyors, such as for example horizontally disposed reciprocating rack conveyors for receiving and moving lineally spaced apart containers past assembly stations in alternating periods of motion and rest by forcefully sliding same along longitudinal trackways, or continuously moving endless belt conveyors for receiving and continuously transporting lineal alignments of containers to a succeeding series of assembly stations at which succeeding individual containers rather than said endless belt, are temporarily arrested from movement by container escapement means for applicator inserting operations during arrested movement of said containers while said belt continues moving. The invention is cyclically operable for inserting applicator closures into containers on aforesaid conveyor means and the invention is triggered into cyclic operation by containers on said conveyor means, or is adaptly operable to be triggered into cyclic operation by power driven elements of said conveyor means rather than by aforesaid containers. In view of the foregoing and for reasons of simplicity, the accompanying drawings illustrate said best embodiment of the invention attached and supported in operative relationship with only those portions of pocketed endless belt conveyor means necessary to clearly illustrate cooperative relationship of the invention with conveyors of various types, and do not illustrate self powered drive elements of said conveyor since aforesaid endless belt portions, or aforesaid reciprocating rack are here to be considered power drive elements of conveyors in general.

Still, other means comprising multiple inserting units of the apparatus of the present invention may be affixed in radial superposed relation to radial container supports on a circular plate for inserting applicator closures to containers moving continuously around a common axis in a circular path of travel together with common container feed and discharge means, common sequence control means and common power drive means comprising the generic system of parts and sequence of operations claimed in the present invention. Hence, the invention in its broader aspects is not limited to the specific means and manner described as a preferred form by way of a best mode of specifically embodying the invention for inline construction and operation.

For further objects and advantages and for a better understanding of the invention attention is now directed to the following description and accompanying drawings.

FIGURE 1 is a top plan view of the preferred form of embodying the present invention as apparatus attached in transverse superposed spaced relation to a pair of side by side endless belts on a common frame plate of a conveyor for simultaneously inserting each one of a pair of closures assemblies into containers, shown in dotted lines, in separate spaced apart lineal alignments thereof on said endless belts, and further illustrates gear transmission housing means, partly in section, to show the gear train for powering separate operating cams for operating separate rod actuating rod means in each one of the pair of inserting units from a common drive shaft.

FIGURE 2 is a front sectional view of FIGURE 1 taken along lines 2—2 thereof to illustrate near surface portions of the apparatus and the various levels, as herebefore referred to and to be referred to in the following specifications and claims, in which lines A—A refer to a floor level, lines B—B are referred to as the lower extreme level, lines C—C are referred to as a lower means level, lines D—D are referred to as an upper mean level, and lines E—E are referred to as an upper extreme level. This figure also illustrates diverter means on near surface portions of the apparatus by which means individual closures are directed from a common feed chute to each one of the inserting units.

FIGURE 3 is taken along lines 3—3 of FIGURE 2 and is a sectional view in elevation of one of the apparatus inserting units, its cam, cam follower and connecting rod operating means, and also sectionally illustrates the dip member guide carriage in position at its uppermost level beneath an inserting unit, cap centering and pressure applying means affixed for movement in unison with said carriage, and a dip member guide arm and further illustrates, in dotted lines a dip member dangling closure momentarily at rest in a releasable holding receptacle, following closures in one of the closure alignment chutes, said dip member carriage with the dip guide members in sliding guiding relation to said dip member and in partially surrounding relationship with the dip member of a said following closure.

FIGURE 4 is an enlarged sectional view of one of the pair of inserting units of the apparatus and is taken along lines 4—4 of FIGURE 3 to more clearly illustrate a releasable holding receptacle and actuating rod means in said unit for supporting and moving manipulative means in the general form of a spreader cam on said bar for opening said releasable holding receptacle and for movement of said rod in unison with a thruster threadably affixed to said bar, and also illustrates means in the form of the end of a closure alignment chute for guidably positioning cap portions of a closure assembly in said holding receptacle.

FIGURE 5 is a rear sectional view in elevation taken along lines 5—5 of FIGURE 1 to sectionally illustrate the pair of side by side endless belt portions of the conveyor, guide rail means for guiding movement of containers in a longitudinal path of movement, pocket means in the form of upright fingers affixed to said belts for receiving and positioning containers in lineally spaced apart alignments, and adjustable stroke eccentric cam operating means for moving the dip member guide carriage between said upper extreme level and said upper mean level.

FIGURE 6 is a partial section view in elevation taken along lines 6—6 of FIGURE 2 to illustrate means on a common drive shaft for diverting individual closures from a common closure feed chute to each one of a pair of closure alignment chutes, means in the general form of a single revolution clutch for engaging a continuously rotating drive pulley to cyclically rotate said shaft, common drive means in the form of a circular gear for driving in unison the separate operating cams for operating the thruster and spreader of the inserting units, and a dip member guide operating cam on near surface portions of the adjustable stroke eccentric cam for operating the dip member guide actuating bar means.

FIGURE 7 is a partial plan view of the bedplate for supporting powered drive parts of the apparatus and is taken along lines 7—7 of FIGURE 6 to more clearly illustrate cam follower rack and pinion means for operating the dip member guide actuating bar means upon rotation of the dip guide member face cam on near surface portions of the adjustable stroke eccentric cam.

FIGURE 8, is a sectional plan view taken along lines 8—8 of FIGURE 5 of the dip member guide carriage, each pair of the separate pairs of dip member guides in spread apart position, manipulative means for operating said guides and further illustrates the parts of said guides for sliding guiding relation to a closure dip member dangling below a holding receptacle in each inserting unit and for sliding partially surrounding relationship to the dip member of a following closure in each one of the closure alignment chutes.

FIGURE 9 is a partial sectional view in elevation taken along lines 9—9 of FIGURE 8 of the dip member guide carriage at the lowest part of its stroke where one of the dip guides is shown moved by the rack part of aforesaid manipulative means out of interfering relation to the cap part of a closure assembly in its descent by gravity for initial assembly to a container, shown on dotted lines, on one of the conveyor belts, and cap centering means and pressure applying means affixed for movement in unison with said carriage for centering a closure cap on said container after its initial insertion thereto, and for pressing it onto said container after centering as aforesaid.

Figure 10:
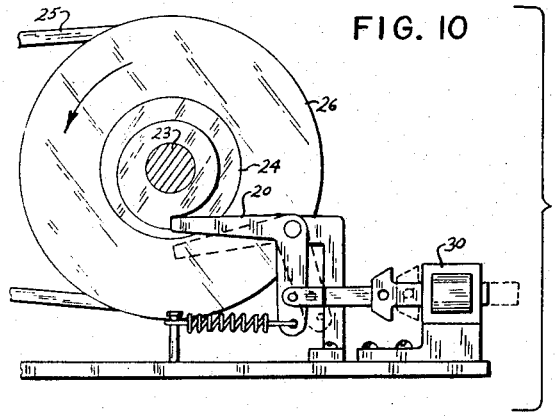
FIGURE 10 is a sectional front end view of the single revolution clutch on the common power drive shaft and the clutch trip means and is taken along lines 10—10 of FIGURE 6.
Figure 13:
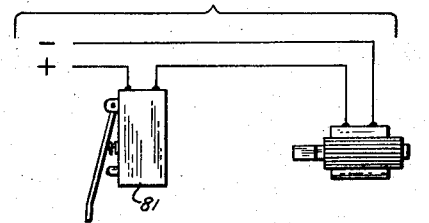

FIGURE 13 is a schematic electrical diagram of electric switch triggering means for triggering the single revolution clutch trip means of FIGURE 10 into operation and is shown in the bracketed view since the electrical switch portion is operable either by containers on the endless belt conveyor as described in the present best mode of embodying the apparatus or by portions of the conveyor common power drive in other modes of embodiment.

Figure 3:
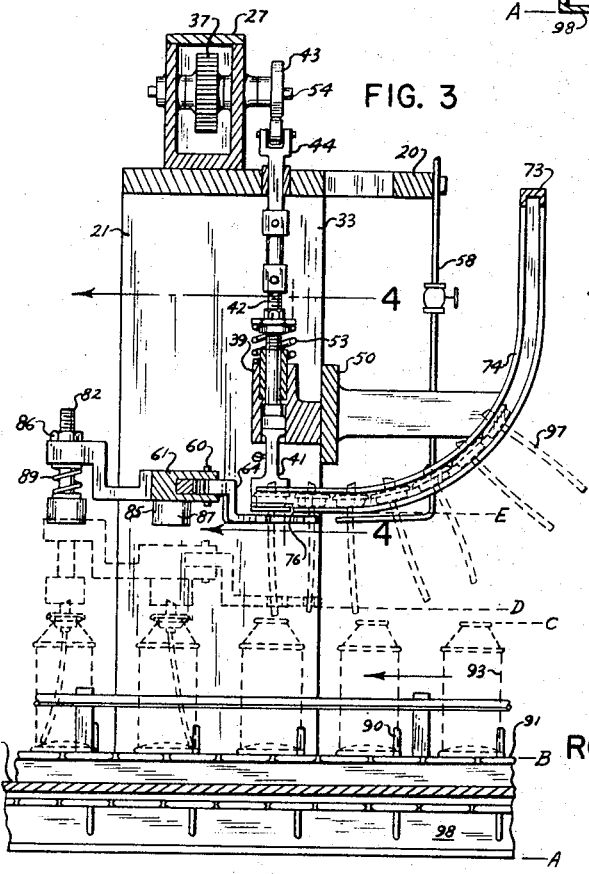
Figure 8:
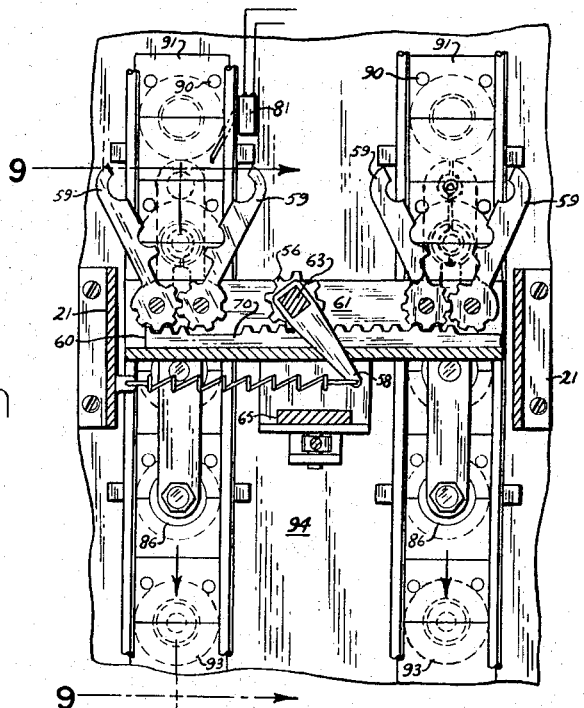
Figure 14:
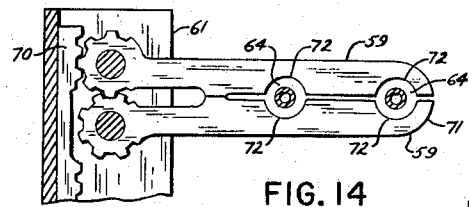

FIGURE 14 is a partial plan view on line 14—14 of FIGURE 3 of one of the separate pairs of dip guide members of FIGURE 8 to more clearly illustrate the radial arm form of each one of the elements of said pair, circular gear tooth and lineal gear tooth rack means for spreading apart and closing said elements in unison with each other to temporarily create a pair of enclosed passageways for moving dip member parts of valves in the holding receptacles in position to enter the opening of a container and for moving dip member parts of valves in the alignment chutes out of interfering relation to the path of descent of valves released and sent from said receptacles.

Figure 15:
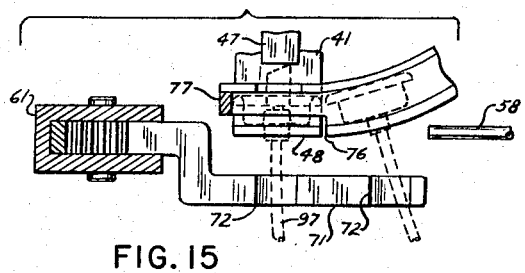

FIGURE 15 is an enlarged vertical cross sectional view of FIGURE 14, and portions of FIGURE 3 to more clearly illustrate closures, in dotted lines temporarily at rest in a holding receptacle, and in the alignment chute, means at the extremity of said chute for positioning the closure in coaxial alignment with thruster part of an inserting unit, and the dip guide member in operative relationship to the dip member parts of the aforesaid closures.

Figure 1:
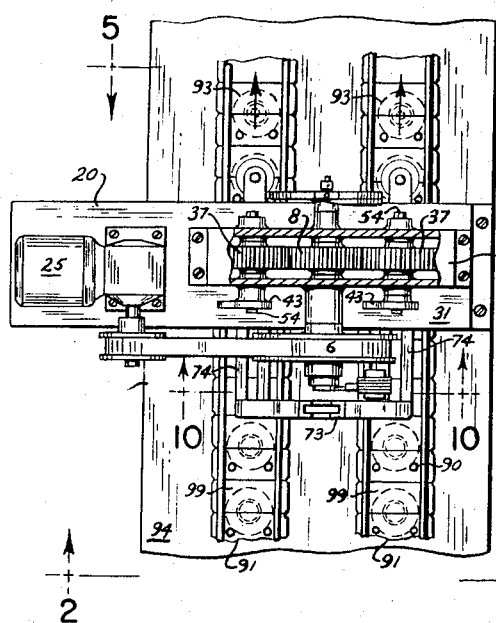
Figure 2:
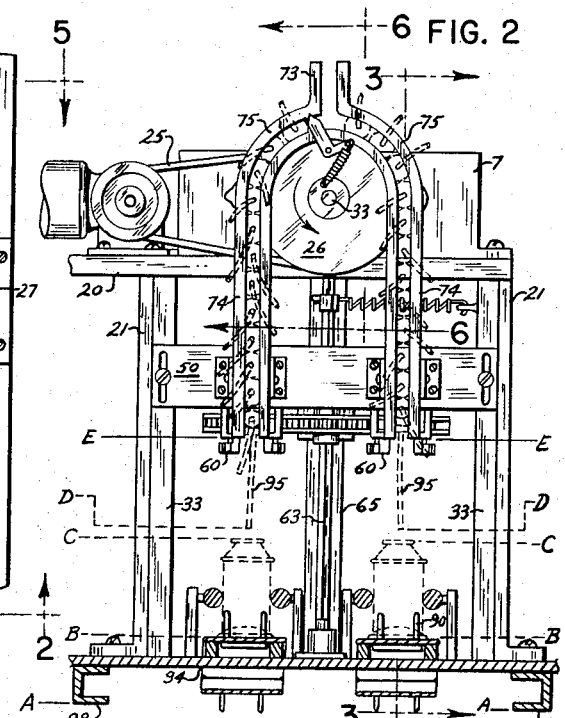
Figure 4:
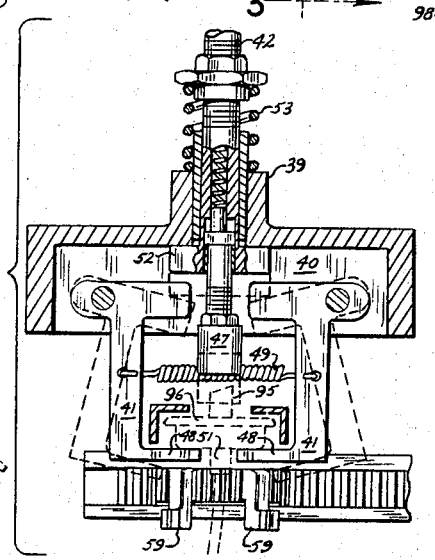
Figure 5:
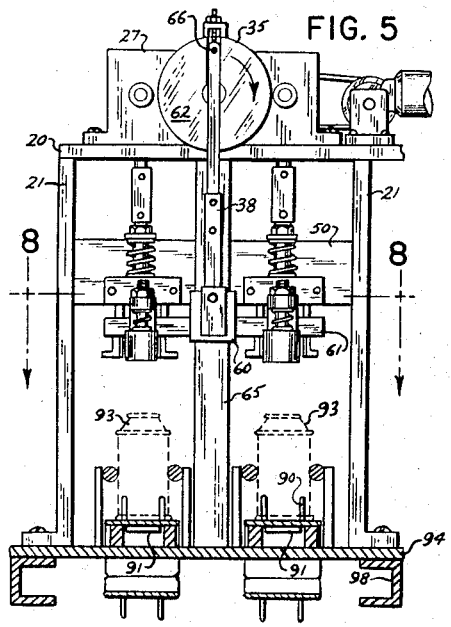
Figure 6:
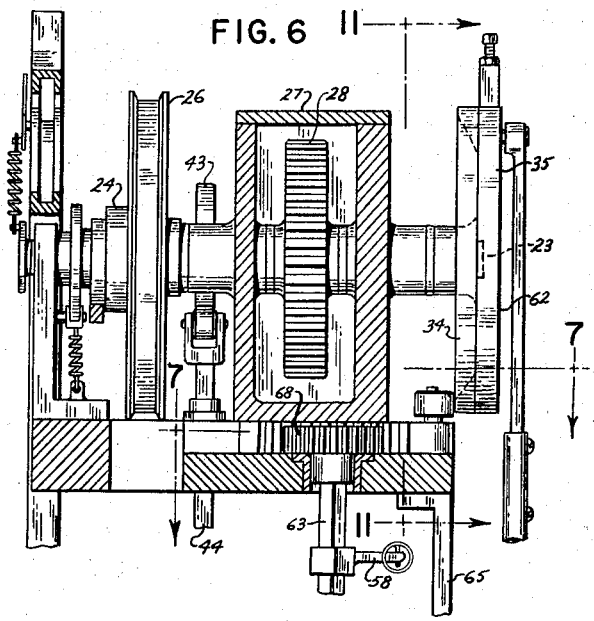
Figure 7:
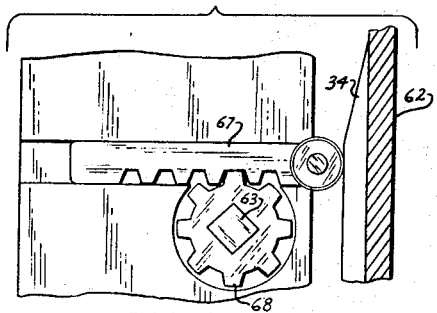

Referring to the drawings, particularly FIGURES 1, 2 and 5 the main frame of applicator closure inserting apparatus 20, in the general form of a bridge structure having a pair of spaced apart upright columns 21 and a bedplate 31 bridging the space between said columns 21 for supporting said apparatus in superposed spaced relation to a pair of side by side endless belt parts 91 of a container conveyor 89 is shown removably affixed to stationary frame elements of said conveyor 89 in upright transverse relation to said belts 91 and in position thereon for said belts to transport side by side lineal alignments of lineally spaced apart container 93, shown in dotted lines, in the space between said columns 21 past the apparatus 20 for initially inserting, centering and pressing applicator closures in the general form of aerosol valves 95 onto a container at rest on each one of the pair of said belts 91. The type of conveyor 89 to which the apparatus 20 is attached in the relation as aforesaid generally comprises stationary frame elements 98 at a floor level A—A for supporting a horizontally disposed transversely spaced apart pair of pocketed endless belts 91 powered for longitudinal sliding movement in unison with each other in interrupted periods of motion on a common frame plate 94 by common drive elements of a conveyor power transmission (not shown) for receiving an individual upright container 93 in each one of pockets 99 on said belts 91 at an extreme upper level B—B above said floor level and transporting said container to, into and past said apparatus for simultaneously inserting an aerosol valve into said containers transported to and temporarily brought to rest beneath the inserting apparatus 20. The inserting apparatus 20 generally comprises a pair of inserting units 39 as shown in FIGURE 4 affixed by stationary means to a common holder plate 50 which plate is movably affixed for vertical adjustment in transverse relation to each one of the near sides 33 of said columns 21 for stationarily supporting each one of said units 39 in above aligned relation to the openings of container 93 on each one of the pair of said endless belts 91; dip member guide means 60 guidably supported for sliding rectilineal movement of said guide means in up and down directions to and from said bedplate 21 by a stationary upright slide guide bar 65 affixed in the space between said endless belts 91 to the common frame plate 94 of the conveyor 89; a motor driven pulley and belt transmission unit 25 supported on the upper surface of a bedplate 31; a pair of separate valve feed alignment chute 74 affixed by stationary means to the holder plate 50 in feeding relation to each one of the pair of inserting units 39; a branched common feed chute 73 having each one of a pair of chute branches 75 removably affixed in aligned feeding relation to each one of the pair of aforesaid alignment chutes 74; and diverting means 84 for alternately moving an individual valve 95 from the common chute 73 to each one of said alignment chutes upon cyclic operation of the apparatus 20. Referring to FIGURE 4, each one of the pair of inserting units 39 comprises a releasable holding receptacle 41 movably supported in a stationary housing 40 part of the inserting unit 39 which receptacle is in the form of a pair of oppositely disposed pendant shelf members 48 in spaced apart relation to each other having a tension spring 49 affixed to each one of said members 48 for normally tending to urge said shelf members towards each other for slidably receiving and momentarily holding loosely at rest the cap part 95 of an aerosol valve 95 in position with the valve dip member 97 dangling freely in the space 51 between said shelf members 49 and beyond said receptacle 41 in a direction towards the opening of containers on the endless belts 91, receptacle operating means 52 in the form of an actuating rod 42 movably supported for sliding rectilineal movement in the inserting unit housing 40 against the action of a compression spring 53 to open the releasable holding receptacle upon movement of the actuating rod 42 to release said cap part 96 and a thruster 47 threadably affixed to the actuating rod for movement in unison therewith to impart a starting impelling force to said cap part 96 to send the valve 95 and its dip member 97 in unison with each other from the receptacle, upon opening the same by aforesaid operating means 52, in a direction towards the opening of a container below said receptacle 41. Before the releasably holding receptacle of each inserting unit is opened as aforesaid, extremity portions of the dangling dip member part 97 of each one of the valves 95 held momentarily in each receptacle 41 are simultaneously moved in position by the dip member guide means 60 to enter the opening of said container below each one of said receptacles. The starting impelling force imparted by said thruster 47 to the valve cap part upon its release from said receptacle is also imparted at the same time to said dip member. For moving extremity portions of said dip member of each valve in position as aforesaid, dip member means 60 comprising separate pairs of horizontally disposed guide elements are provided, and referring to FIGURE 8, aforesaid dip member guide means generally comprises a horizontally disposed transverse carriage 61 for movably supporting transversely spaced apart separate dip guide members 59 individually in position below each one of the inserting units 39 for movement of said guide members 59 into guiding relationship with part of the valve dip member 97 dangling below each one of the holding receptacles 41, and into partially surrounding relationship with dip member parts of following valves in each one of said alignment chutes, and for continuing movement of said guide members 59 while in sliding guiding relationship with said dip member 97 in a rectilineal path of travel in a direction away from said holding receptacles 41 to move the extremity of each one of the respective said valve dip members 97 in position to enter the opening of a container below each one of the inserting units and to move the dip member extremities of said following valves out of interfering relation to the path of descent of valves to be released and sent from said receptacles to said container openings. Each one of the dip guide members 59 as shown in FIGURE 8 in general and more clearly in FIGURE 14 is in the form of a pair of opposed radial arm elements 71 journalled in gear tooth engaged relation with each other on the transverse carriage 61 in position thereon with opposed recessed dip member guide portions 72 of each arm radially outward from said carriage for arcuate movement in unison with said guide portions 72 into impinging relation with each other, to temporarily create a pair of passageways 64 one pair of which is in coaxial alignment below one of the pair of inserting units 39 while the remaining passageway so formed is in coaxial alignment below the cap part of a following valve in said chute, said arms being journalled for further arcuate movement of said guide portions 72 out of impinged relation with each other to spread said portions apart to create a space wide enough to allow free passage of a valve cap part 95 past said portions 72. Manipulative means in the form of rectilineal gear toothed rack 70 and pinion 56 are movably supported on the carriage 61 with the rack 70 supported for transverse sliding movement in said carriage in engaged relation with opposite radial arms 71 in each of the dip guide members 59 with aforesaid pinion 56 rotatably affixed to said carriage for arcuate movement thereon in gear toothed engaged relation with said rack 70. The pinion 56 is journalled on the carriage 61 in engaged relation with said rack in the manner aforesaid, and is also in sliding engaged relation with a vertically disposed stationary actuating bar 63 journalled for horizontal arcuate rotation at its upper portion in the bedplate 31 of the apparatus 20 as will be seen in FIGURE 6 and referring to FIGURE 3, at its opposite end portions in a journal box affixed by stationary means to the frame plate 94 of the conveyor 89. The actuating means for operating the aforesaid manipulative means therefore comprises the actuating bar 63 an upper pinion 68 affixed to said bar for arcuate rotation in unison therewith in recessed portions of upper surfaces of the bedplate 31 and a tension spring 58 loaded lever 55 affixed to said bar 63 in position thereon below the bedplate 31. Referring to FIGURE 7, the parts for operating the pinion 68 to arcuately rotate the actuating bar 63 against the action of the tension spring 58 comprise an upper cam follower gear toothed rack 67 in engaged relation with said pinion 68 and supported for lineally guided sliding movement in lineally recessed upper surface portions of the bedplate 31 in position thereon with the cam follower roller part of rack 67 in rolling engaged relation with a circular face cam 34 part of the sequence controlled operating means of the apparatus. Referring to FIGURE 5 the dip guide member carriage 61 affixed to the slide guide bar 65 for sliding movement thereon as aforesaid is operated for movement of said carriage in up and down rectilineal movements by an adjustable stroke eccentric cam 35 part of the sequence controlled operating means and cam follower parts in the general form of an adjustable length connecting rod 38 movably connected to said cam 35 and said carriage 61. The sequence controlled operating means of the apparatus for operating the various actuation means in a predetermined sequence comprises then, aforesaid face cam 34, adjustable stroke eccentric cam 35 and separate operating cams 36. Referring to FIGURES 1 and 6 the main drive elements of the apparatus are supported by stationary means on upper surface portions of the bedplate 31 and generally comprise a common drive shaft 23 longitudinally journalled in a transverse gear housing 7 for cyclic rotation therein, with a drive pulley 6 freely rotatable on said shaft, a single revolution clutch 4 supported on said shaft 23 in operative relationship with said pulley 6 for cyclically transmitting rotative power from said pulley to said shaft for cyclic rotative operation of said shaft, and electric motor drive belt transmission means 5. A circular drive gear 8 enclosed in the gear housing 7 is also affixed for rotation in unison with said drive shaft, and as will be seen in FIGURE 1, is in engaged relation with transversely spaced apart separate driven gears 37 having separate driven shafts 54 journalled in the gear housing 7 for cyclically rotating said shafts 54 in unison with cyclic rotation of said drive shaft 23. Each one of a pair of separate inserting unit operating cams 43 is affixed for rotation in unison with each one of said shafts 54 for operating separate cam follower 44 parts slidably journalled for up and down rectilineal movements in the bedplate 31 below said cams 34.

Figure 11:
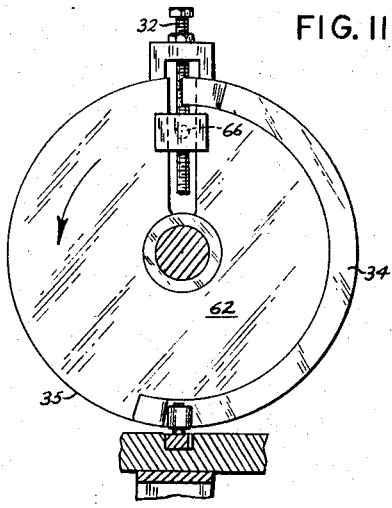
FIGURE 11 is a sectional front view of the common power drive shaft and part of the bedplate and is taken along lines 11—11 of FIGURE 6 to illustrate the face cam on near surface portions of the adjustable stroke eccentric cam for arcuately rotating dip member guide actuating rod means against the action of a spring loaded lever affixed to said rod as shown in FIGURES 6 and 8.
Figure 12:
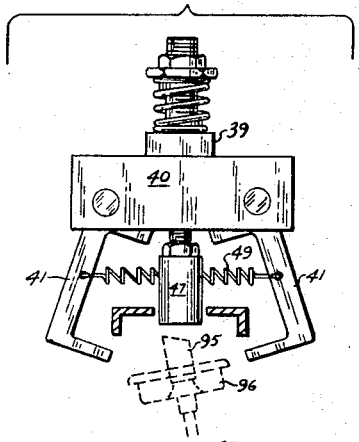
FIGURE 12 is an elevational view similar to FIGURE 4 showing the holding receptacle of FIGURE 4 spread apart and the dip member guide moved out of interfering relation to cap portions of a closure assembly, shown in dotted lines, released from said receptacle after dip member extremity portions of said assembly have been forced by the thruster substantially into a container shown in dotted lines.
Figure 12:
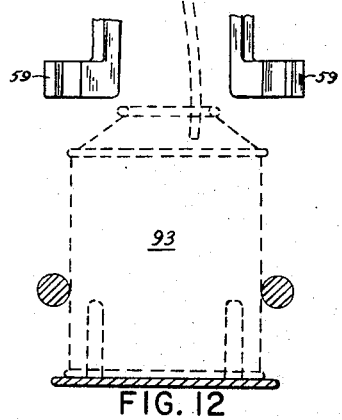

Separate connecting bars 45 are removably connected individually to each one of the cam follower parts 44 and to each one of the actuating rods 42 in the inserting units for imparting movement of said cam follower parts 44 to said rods 42 against the action of a compression spring 53. Referring to FIGURES 6 and 11, the adjustable stroke eccentric cam 35 is affixed for rotation in unison with said drive shaft 23 and comprises a radially outward slotted circular plate 62 having stroke adjusting means in the form of a radially outward movable pivot 66 in sliding engaged relation with slotted far side portions of the plate 62. The pivot 66 extends on the far side of said cam 35 and is threadably engaged with a radial adjusting screw 32 rotatably affixed to a stationary member affixed to peripheral portions of the circular plate 62 adjacent each side of said slotted portions for moving said pivot, to which the adjustable length connecting rod 38 as shown in FIGURE 5 is movably affixed, in radial directions towards and from the drive shaft 23 for adjusting the stroke of said cam 35 to adapt the apparatus to be operable with valves having dip members of different lengths. The face cam 34 for operating the dip guide member actuating bar 63 is affixed by stationary means to near surface portions of the adjustable stroke cam 35 for rotation in unison therewith.

Referring now to FIGURES 10 and 11, the drive pulley 26 is normally in continuous uninterrupted rotation on the drive shaft 23, and an electrically operated solenoid 30 and solenoid linkage momentarily actuates a clutch trip 29 pivotally journalled on an upright bracket in position thereon in operative relationship to said clutch 24 for arcuately moving the trip 29 in disengaged relation with the clutch, as shown in dotted lines, against the action of a tension spring for the clutch to engage said pulley for cyclically transmitting rotative motion of said pulley to the drive shaft 23. After momentary movement of the trip 29 out of interfering relation with the clutch release member, the clutch instantly engages said pulley and stays engaged until the release member and drive shaft 23 complete a single revolution whereupon the clutch is disengaged from said pulley by interference of the trip with further rotative movement of said release member.

Means for triggering the clutch trip solenoid 30 into operation are illustrated in FIGURES 8 and 13 in the form of an electric switching element 81 electrically connected to said solenoid 30 and supported on the frame plate 94 of the conveyor 89 in interfering relation to the path of travel of containers on one of the pair of endless belts 91. Said triggering means are illustrated in this form in the relation stated simply for reasons of briefly describing a preferred and best mode of embodying same, but is not in all its aspects limited to this since the switching element 81 is also operable in interfering relation to any of the power driven elements of the conveyor 89 such as for example, in interfering relation to the upright pocket fingers 90 on either one or both of the endless belts 91, or instead of this, in interfering relation to elements of the integral power transmission means of the conveyor 89.

Figure 9:
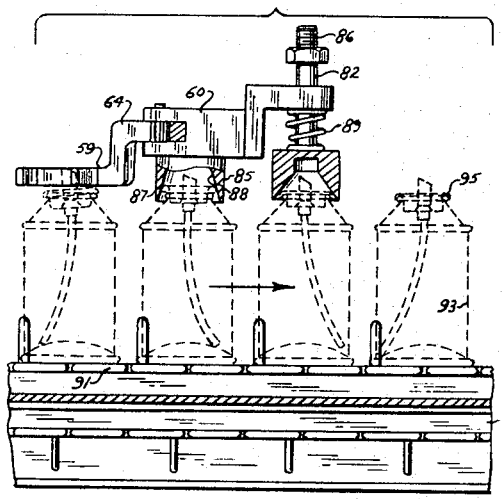

It will be noted here that during cyclic operation of the main drive shaft 23 a valve in each one of the holding receptacles 41 is released from its respective receptacle upon opening of same and is sent by said thruster 47 therefrom at a momentum greater than gravity, and that the valve cap part 96 is guided, during its essentially free fall by accelerated gravity from said receptacle, in a direction generally towards the opening of the container beneath its respective receptacle 41 by portions of its dip member in sliding guiding relation to inside wall portions of said container opening, and is arrested from further free fall by its impingement with portions of said container opening. Since the dip member part of an aerosol valve, and other types of applicator closures, may, in instances, be curved out of axial alignment with said cap part it is largely a matter of chance that said cap part will come to rest in axial alignment with the container opening. Cap centering means 85 and pressure applying means 86, referring to FIGURES 3 and 9 are therefore provided in the apparatus in anticipation of the fact that containers with misaligned valve caps thereon will be moved by said belts beyond the inserting apparatus 20 to cause malfunction of ensuing machinery operations, such as in crimping operations wherein said cap part must be generally centered over a container opening before it is permanently affixed to said container, and in anticipation of the use in the apparatus of applicator closures having cap parts adapted for frictional attachment to container openings in which pressure is applied to said cap part, after centering of same as aforesaid to removably attach said closures to container openings. The cap centering means 85 comprises a pair of transversely spaced apart rectilinear cylindrical centering members 87 of a resilient material each having a funnel shaped opening 88 and are affixed for movement in unison with the carriage 61 of the dip member guide means 60 in position thereon lineally beyond said holding receptacles 41 with the opening 88 in each one of said pair of members 87 being in the direction of containers on said belts 91 and is provided for moving misaligned valve caps in aligned relation to the opening of containers after said containers with misaligned valve caps thereon are moved by said endless belts 91 and come to rest beyond said receptacles 41.

After a valve cap is aligned with the opening of its respective container as aforesaid, it is pressed onto the opening of said container by pressure applying means 86. Said pressure applying means 86 comprises each, one of a pair of transversely spaced apart funnel mouthed upright plunger parts 82 supported for movement against the actions of a compression spring 89 in a bracketed part affixed by stationary means to the carriage 61 for movement of said pressure applying means 86 in unison with said carriage, with said plunger parts supported lineally beyond said centering means 85 in position with funnel mouthed portions thereof in a direction towards said endless belts 91, for pressing on the valve cap part of a valve to seat same onto the opening of containers moved by said endless belts 91 and brought to rest beyond said centering means 85.

For feeding individual closures into each one of the pair of holding receptacles 41 in the inserting units 39, a pair of separate transversely spaced apart upright alignment chutes 74 are affixed by stationary means to the near side of the inserting unit holder plate 50 in position thereon with discharge portions of each one of the pair of chutes 74 in feeding relation with said holding receptacles 41. Each one of the pair of chutes 74 comprises a pair of spaced apart members having opposed trackways for receiving the cap part of a valve with a dip member of said valve dangling freely in the space between said members for guiding the sliding descent by gravity of individual valves in an alignment thereof in a predetermined path of travel from a level above said inserting units 40 to said inserting units at a lower level. The discharge portions 76 of each one of the pair of chutes 74 comprises, as more clearly shown in FIGURES 3, 4 and 5 trackway portions of said chute in superposed spaced relation to the shelf members 48 of a pair of holding receptacles 41 with the shelf members 48 of said receptacle in surface alignment with lower parts of the chute trackways and with remaining parts of said chute members for lineally guiding sliding movement of valve cap parts sliding by gravity from said trackways into said holding receptacle shelf members 48, and arresting means 77 affixed to the extremities of each said chute member in transverse interfering relation to the path of travel of a valve cap in its movement from said trackways to said shelf members for arresting said movement and for positioning said cap in its axially aligned relationship with the actuating rod 42 in a respective one of the pair of inserting units.

The foregoing alignment chutes 74 supported in the relationship as stated are generally provided for slidably receiving cap parts of valves manually fed by hand into each one of said chutes, or, for slidably receiving said cap parts automatically fed from each one of a pair of automatic feeding hoppers to individually fed valves to said chutes, or for slidably receiving the cap part of valves automatically fed from common valve feeding hopper. To adapt the individual feed chutes 74 to be operable with a common valve feeding hopper, a common feed chute 73 and diverting means 84 are provided. Said common feed chute 73 is similar in cross sectional construction to the aforesaid alignment chute and comprises a common feed chute portion 73 having each one of a pair of branches 75 supported in feeding relation to each one of aforesaid alignment chutes 74.

Individual valves are metered from discharge portions of the common feed chute 73 alternately into each one of the branches 75 by a valve diverter, as shown in FIGURE 2, comprising an arcuately movably upright blade movably affixed by stationary means to said common feed chute 73 in position for upright portions of said blade to arcuately oscillate back and forth past discharge portions of said common feed chute to receive and forcibly move an individual valve first to one branch then to the other branch of said common feed chute against the action of a yieldable connecting link in the form of a tension spring.

The sequence control operation means comprising the adjustable stroke eccentric 35, face cam 34 and separate operating cams 43 are set first for the following series of operations, first for the face cam follower to be moved off of the face cam 34 under the action of a tension spring loaded lever 58 to come to rest on near surface portions of the adjustable stroke eccentric cam 35 to arcuately rotate the actuation bar 63 for operating the dip member guide manipulative means to move the recessed guide elements 72 of each one of the pairs of guide members 59 in unison into sliding guiding relationship with part of a valve dip member dangling below each one of the holding receptacles 41 and into partially surrounding relationship with the dip member of a following valve in each one of the alignment chutes 74 with (a) continuing movement of the eccentric 35 to move the dip member guide means 60 downwardly in a direction towards the endless belts 91 while said guide elements are in sliding guiding relation with said dip member, (b) then for the operating cams 43 to actuate the receptacle operating means to open each receptacle and for the thruster 47 to impart an intial impelling force to cap parts of a valve released from said receptacle, after dip member extremity portions of a following closure in each one of the alignment chutes 74 are moved by the radially outward elements 72, out of interfering relation to the part of travel of said cap parts and after extremity portions of the dip member of each one of the valves in the releasable holding receptacles are moved in position by said guide elements to enter the openings of containers on said endless belts, (c) a continuing movement of said guide means 60 downwardly in a direction as aforesaid with a continuing movement of said eccentric 35 in unison with said face cam 34 to (d) engage said face cam follower to move the actuating bar 63 for actuating the dip member guide manipulative means to spread apart the individual pairs of guide arms 59 against the action of the tension spring loaded lever 58 and for moving said elements 72 and arms 59 out of aforesaid guiding relation with said dip member and out of the path of descent of the cap part of a valve released and sent from said holding receptacles towards said containers, and then for (e) momentarily arresting movement of said guide means 60 and (f) then to reverse the direction of movement of said guide means to return said guide means to its normal starting position at an upper level below said holding receptacles.

It is to be noted here that upon actuation of the clutch trip, the drive shaft 23 makes a single 360 degree revolution starting and ending at 0 degree, referring to FIGURE 11, and that continuous movement of the dip member guide means 60 from and towards said holding receptacles 41 is instantaneously temporarily interrupted at the instant said direction is reversed, and that the dip member guide elements 72 are moved as aforesaid into and out of guiding relationship with the valve dip member during movement of said guide means in a direction away from said holding receptacles 41.

Although the apparatus 20 is ideal for association with conveyors having a pair of side by side endless belts for inserting applicator closures into containers two at a time, the generic features of this invention are also applicable to apparatus for association with individual belt container conveyors for inserting an individual applicator closure to individual containers one at a time. For this only one inserting unit 39, and pair of dip guide arms 59 are supported in an upright frame similar to shape as that frame 22 herebefore described as for supporting apparatus for inserting applicator closures into containers two at a time. For adapting the present apparatus to be operable with applicator closures having rigid axially aligned dip members, such as a glass rod, or a brush at the end of an axially aligned stem for inserting applicator closures into containers at high volume production rates, and at the same time to reduce wear and tear on the apparatus, the dip member guide means 60 is affixed by stationary means to the guide bar 65 at a stationary level above the openings of upright containers on the endless belts for actuation of the dip member guide manipulative means by the face cam 34 to move the separate pairs of dip guide arms 59 and their guide elements 72, at said stationary level into and out of guiding relationship with the extremity of a dip member dangling at an upper mean level below said receptacles for moving said extremity in position at said upper mean level to enter the opening of a container as aforesaid. For this, the sequence control operating means comprises the face cam 34 and operating cams 43 and is set first to actuate the dip member guide manipulative means to move the guide arms 59 in unison in guiding relationship to a valve dip member extremity dangling below each one of the pair of holding receptacles 41 in each one of the pair of inserting units to move said extremity individually in unison in position to enter the opening of a container below each one of said receptacles, then to actuate the receptacle opening means 52 to open the receptacle 41 in each one of said inserting units to release the valve cap part 96 and for the thruster 47 to impart a starting impelling force to said cap part while the guide elements 72 are in aforesaid guiding relationship with the extremities of said dip members to send the dip member extremity and cap part of each valve into and towards said containers, and then to actuate said manipulative means against the action of a spring loaded lever 58 to open and spread individually apart said guide arms 59 to move same out of aforesaid guiding relationship and out of the path of travel of said cap part sent from said receptacle as said cap part, in its free fall approaches said guide.

In operation the apparatus 20 is removably attached to the frame of a conveyor 89 in relation to the endless belt portions of said conveyor as previously stated with the drive pulley 26 driven by the electric motor and belt transmission means 25 in continuous uninterrupted rotation. Successive upright containers at a loading station are placed in pocketed portions 99 of the endless belts while said belts are temporarily at rest on the conveyor frame plate 94, and upon movement of said belts the containers are lineally transported in successive periods of motion and rest from said loading stations to be moved past the switching element 81 in the present invention. As one of the pair of endless belts with a container at rest thereon gradually comes to rest, said container temporarily impinges the electrical switching element 81 to electrically actuate the clutch trip solenoid 30 for said solenoid to move the trip lever 29 out of engaged relation with the clutch release member. The switching element 81 is positoned on the main plate 94 of the conveyor slightly ahead of the inserting apparatus 20 for a container to electrically actuate the clutch trip as said container enters the apparatus for triggering the drive shaft into cyclic operation by said solenoid 30 to initially operate the dip member guide means to move same in sliding guiding relationship with the dangling dip member part of a valve in each one of the holding receptacles and into partially surrounding relationship with the dip member of a following valve in each one of the alignment chutes as said endless belts with the containers thereon move past said switching element 81. As said containers come to rest below the holding receptacles, the dip member guide means moves downwardly along said dip members to move the extremities of the dip member part of a valve in each one of the holding receptacles in position to enter said container openings and to move the dip member extremities of a curved dip member part of a following valve in each one of the alignment chutes out of interfering relation to the downward path of travel of the valve cap part to be released from each one of the holding receptacles. After said containers are at rest, the releasable holding receptacles 41 in each one of the inserting units is opened to release the cap part of a valve momentarily held at rest therein, and the thruster 47 part of each one of the inserting units moves to impinge said cap to impart a starting impelling force to the valve released and sent from the holding receptacle to send the dip member extremity of each one of the valves through the passageway formed by the closed guide elements 72 of the guide member arms 59 into the opening of its respective container, and, at the same time said thruster 47 moves into interfering relation with the path of travel of following valves in each one of the alignment chutes 74 to arrest movement of said following valves in each one of the alignment chutes 74 to arrest movement of said following valves in said alignment chute to prevent same from entering the shelf members 48 of the holding receptacles 41 until cyclic rotation of the main drive shaft 23 is completed by return of the cam 35 to 0 degree position. As the cap part 96 sent from the holding receptacles 41 in its descent towards said container approaches the dip member guide means, the dip guide arms 59 are moved out of interfering relation with the path of descent of said cap part 96 for free passage of said cap part past said arms 59 for the cap part to come to rest by gravity on portions of the container opening. After the container with a valve is moved by said conveyor to come to rest beneath the centering means 85 beyond the inserting units 39 and upon a following cyclic operation of the drive shaft 33 said cap part is first centered over the opening of its respective container, then after said container with a centered valve cap thereon is moved by said conveyor and comes to rest below the pressure applying means 86 beyond said centering means upon a second cyclic operation of the drive shaft, said cap is pressed onto its respective container opening. Referring to FIGURE 3 air blast transfer means in the form of a pair of air blast air tube and air valves is provided in operative relationship to each receptacle 41 for forcing movement of individual valves from the alignment chutes 74 into the releasable holding receptacles 41. A continuous blast of compressed air is directed to impinge the cap part of a valve in each one of the pair of alignment chutes 74 by an air tube supported on the bedplate 20 of the apparatus.

Having thus described my invention, and having achieved the objects as set forth,

I claim:

1. Applicator closure inserting apparatus adapted for association with self powered container conveyor means for placing by accelerated gravity means successive individual applicator closures, each having a container closure cap part with an axially projecting dip member, onto containers in arrested movement on said conveyor means, said apparatus comprising in combination; support structure means adapted to be attached to stationary frame parts of an intermittently movable self powered container conveyor for supporting parts of applicator closure apparatus in operative relationship to the opening of an individual upright container in arrested movement on said conveyor means, stationary releasable closure cap holding receptacle means supported for receiving and momentarily holding loosely at rest the cap part of an applicator closure in position with the closure dip member dangling freely beyond said receptable in a direction towards the opening of said container, receptacle opening means supported for opening said receptacle to release said cap part and for imparting a start impelling force to said cap part to send same from said receptacle in a direction towards said container opening and to send in unison therewith the dip member of said closure into said container, dip member guide means supported by stationary means at a fixed distance from said receptacle for movement in guiding relationship to extremity portions of a closure dip member while the cap part of said closure is held momentarily at rest in said receptacle to guidably move the extremity of said dip member in position to enter the opening of said container, dip member guide manipulative means supported for moving said dip member guide in aforesaid guiding relationship and for moving same out of said guiding relationship and out of interfering relation with the path of travel of a closure cap part released and sent from said receptacle, dip member guide actuating means supported for moving said manipulative means, cyclically operable sequence control operating means supported for moving aforesaid dip member guide actuating and receptacle opening means in a predetermined sequence, trigger means supported in operative relationship with said sequence control operating means for initiating same into cyclic operation, and trigger actuating means supported in cooperative relationship with said trigger means and adapted for attachment and operation in operative relationship with powered movable element of said conveyor.

2. Apparatus as claimed in claim 1 and in which said sequence control operating means comprises one of the group consisting of rotatable circular cams affixed for rotation in unison with cyclically operable rotatable drive shaft means, single revolution clutch power transmission means supported for powering cyclic rotative movement of said shaft, cam follower parts supported in operative relationship to said cams and connected to the opening means for opening the holding receptacle and for operating the dip member guide manipulative means; compressed air operable piston cylinders and cylinder linkages; and in which said trigger actuating means comprises one of the group consisting of electric switches, cam operated air valves.

3. Apparatus as claimed in claim 1 and in which the dip guide member is supported for movement into guiding relationship with part of the closure dip member while cap portions of the same are held momentarily at rest in said releasable holding receptacle and for continuing movement of said guide in a predetermined path of travel in a direction away from said receptacle sliding along said dip member to guidably move the extremity of said dip member in position to enter the opening of a container below said receptacle and for continuing reverse movement of said guide member in a direction towards said receptacle after the closure cap is released from said releasable holding receptacle and after the guide member is moved out of guiding relationship to the closure dip member extremity as aforesaid, and in which said sequence control operating means includes operating means for moving the dip guide member in aforesaid direction away from and towards said receptacle in a predetermined sequence.

4. Apparatus as claimed in claim 1 and in which the releasable holding receptacle means comprises a pair of spaced apart shelf members movably supported in a stationary housing and closing means supported for normally tending to urge each one of the pair of said members in a direction towards the other and in which the dip guide member comprises a pair of guide elements movably supported in a movable platform with closing means supported for normally tending to urge each one of said pair of guide elements in unison towards the other.

5. Apparatus as claimed in claim 1 and in which said receptacle opening means for the holding receptacle comprises cams and cam followers supported in operative relationship with said releasable holding receptacle means and in which said dip member guide manipulative means comprises circular rotatable gears and rectilinear gear racks slidingly supported in engaged relation with said gears.

6. Apparatus as claimed in claim 1 and in which the sequence control operating means comprises a single revolution clutch for imparting cyclic rotative movement to a main drive shaft, driven shaft means in gear toothed engaged relation with said main drive shaft, cam and cam follower linkages supported in cooperative relationship with said driven shaft means and in operative relationship with said releasable holding receptacle means for operating said receptacle, circular segmented cam means supported for movement in unison with said main drive shaft and cam follower means supported in cooperative relationship to said segmented cam means and in operative relationship to said dip member guide manipulative means for operating same.

7. Apparatus as claimed in claim 1 and which includes applicator closure feed chute means supported in operative relationship to said releasably holding receptacle means for feeding individual applicator closures in an alignment thereof in said chute to said receptacle, said chute comprising a pair of spaced apart members having opposed trackways for slidably receiving the cap part of said closures with the dip members thereof dangling freely in the space between said members for guiding sliding descent by gravity of said closures in a predetermined lineal path of travel from an upper level above said holding receptacle means to discharge portions of said chute in feeding relation to said releasable holding receptacle means at a lower level, compressed air blast transfer means for sliding transfer of an individual closure from discharge portions of said chute into said holding receptacle, stationary guide means supported for guiding cap parts of said closures in a lineal path of travel during transfer of same as aforesaid and for laterally positioning said cap part in said receptacle after transfer of same as aforesaid, stationary arresting means supported in interfering relation to aforesaid lineal path of travel of said cap part for arresting movement of said cap part, after its transfer as aforesaid, to lineally position same in the holding receptacle in operative relationship to receive a start imparting force by the aforesaid receptacle opening means.

8. Apparatus as claimed in claim 1 and in which the sequence control operating means is set first to actuate the dip member guide manipulative means to move said guide into guiding relationship with extremity parts of a closure dip member dangling freely beyond said releasable holding receptacle means, then to actuate the receptacle opening means for opening the receptacle to release the closure cap part and to impart a starting impelling force to said cap part, while said guide is in guiding relationship with extremity parts of said dip member, to send said extremity parts into the opening of a said container and to send said cap towards said opening, and then to actuate said guide manipulative means to move said guide means out of interfering relation to the path of travel of said cap part sent from the receptacle as aforesaid as same approaches said guide means.

9. Apparatus as claimed in claim 1 and which includes closure cap centering means supported for movement in unison with said dip member guide means as same is moved as aforesaid in a direction away from and towards said receptacle, for moving misaligned closure caps in aligned relation to the opening of a container after said container with a closure thereon is moved by said conveyor and comes to rest beyond said receptacle, and which includes pressure applying means supported for movement as aforesaid in unison with said closure cap centering means for seating a closure cap onto said container opening after said container with a closure cap centered over its opening is moved by said conveyor and comes to rest beyond said closure cap centering means.

10. Apparatus as claimed in claim 1 and in which said dip member guide means is supported for movement in unison into sliding guiding relationship with part of a dip member of a closure held momentarily at rest in said holding receptacle and into sliding guiding relationship with part of a dip member of a following closure in position to be fed thereto by a feed chute means and for continuing movement of said guide member along said said dip member to guidably move the dip member extremity of the closure held momentarily at rest in said holding receptacle in position to enter the opening of a container below said receptacle and to guidably move the dip member extremity of a following closure in a said feed chute means out of interfering relation with the path of descent of a closure released and sent from said holding receptacle to said opening of a container below said receptacle.

11. An applicator closure inserting machine for association with a container conveyor having a plurality of side by side endless belt transport means on a common conveyor frame with common drive means for moving each one of said plurality of endless belts in unison with each other in intermittent periods of motion to receive and transport transversely aligned like alignments of lineally spaced apart upright containers to, into and past parallel assembly stations for inserting at the same time a plurality of applicator closures, each having a container cap part with an axially projecting dip member, into an equal number of containers after first slidably receiving and momentarily holding at rest at the same time the cap part of each one of said applicator closures in inserting relationship to the openings of individual one of said containers at rest, then aligning, at the same time, the dip member extremity of each one of said closures over the openings of said containers, and thereafter at the same time releasing said cap part of each one of said closures for sliding the dip member into and cap part of each closure onto each one of said containers by accelerated gravity means; said inserting machine comprising in combination: structure means adapted to be attached to the frame support of a self powered transport endless belt means aforesaid for supporting applicator closure inserting apparatus in cooperative relationship with the openings of transversely aligned side by side like alignments of upright containers on said conveyor belt means, a plurality of stationary releasable holding receptacles on a common support in said structure means for receiving and momentarily holding at rest, at the same time the cap part of each one of a like number of applicator closures loosely in position therein with dip member parts of said closures dangling freely beyond said receptacles, separate receptacle releasing means supported in operative relationship with said receptacles for releasing each one of said receptacles to release the cap part of each one of said closures, separate receptacle release actuating means supported for operating each one of said separate receptacle releasing means in unison, separate dip member guide means supported on carriage means at a lower level than said holding receptacle in said structure means in operative relationship to the aforesaid holding receptacles for movement of said dip member guide means in coaxial alignment with said receptacles and in guiding relationship to extremity portions of a closure dip member dangling beyond each one of said receptacles to guidably move the extremities of said dip members in position to enter the opening of containers at rest on the aforesaid conveyor belt means, manipulative means supported on said carriage means for moving said separate dip member guide means in unison into guiding relationship as aforesaid, dip member guide actuating means supported for operating aforesaid manipulative means, stationary applicator closure feed means comprising a plurality of individual closure feed chutes individually supported on a common support means in feeding relation to individual ones of said releasably holding receptacles, common closure alignment chute means having diverging branches supported in feeding relation to each one of said feed chutes, metering means supported for moving individual applicator closures from a discharge portion of said common alignment chute into each one of said branches, actuating means supported for operating said metering means in a predetermined sequence, said feed chutes individually comprising a pair of spaced apart members having opposed trackways for slidably receiving the cap part of applicator closures in position with dip member parts thereof dangling freely in the space between said members and guiding same in a predetermined path of sliding descent by gravity from a level above said receptacles to chute discharge parts in feeding relation to said receptacles at a lower level, sequence control operating means for operating the aforesaid actuating means for release of the receptacles, the dip member guide actuating means, the actuating means for the metering means, and the carriage and triggering means adapted to be supported in cooperative relationship with one of a group comprising containers on said conveyors and power drive elements of a said container conveyor and in operative relationship with a sequence control operating means for triggering said sequence control operating means into cyclic operation upon actuation of said triggering means by said drive elements.

12. Apparatus as claimed in claim 11 and in which each one of said releasable holding receptacles comprises a stationary housing, a pair of shelf members in normally spaced apart relation to each other and movably supported in said housing and urged towards each other under the action of a third resilient member, opening means for spreading apart said shelf members to provide a closure cap passageway between said shelf members, accelerating means movably supported in operative relationship to said shelf members for movement into the area for caps on said shelf members upon spreading apart of said shelf members, common actuating means supported in said housing for operating aforesaid opening and accelerating means, and in which said carriage is movably affixed to said structure means and supported for movement of each one of said dip member guide means in unison in guiding relation with part of the dip member dangling from a closure cap in each one of said holding receptacles and with a part of the dip member of a closure in each one of the aforesaid closure feed chutes and for continuing movement of said carriage in a direction axially away from said receptacles for moving said guide means in aforesaid guiding relationship along each said dip member to guidably move the extremity of said dip members in position respectively to enter the opening of a container at rest on said conveyor and out of interfering relation to the travel path of the cap part of a closure released and sent from said holding receptacles and for continuing movement of said guide carriage in a direction towards said holding receptacles upon the spreading apart of said guide means, adjustable length carriage actuating means for adapting the apparatus to be operable with closures having dip members of different lengths and for moving said carriage in aforesaid direction away from and towards said holding receptacles, said sequence control operating means being adapted for operating aforesaid common actuating means for operating said opening and accelerating means and for operating aforesaid carriage actuating means in a predetermined sequence.

13. Apparatus as claimed in claim 12 and in which said triggering means are supported in operative relationship to containers on said conveyor rather than in operative relationship to power drive elements of said conveyor for triggering said common power drive means into cyclic operation by said containers.

References Cited
UNITED STATES PATENTS

| | | | |
|---|---|---|---|
| 3,212,173 | 10/1965 | Wonneman | 29—208 |
| 3,212,174 | 10/1965 | Wonneman | 29—208 |
| 3,212,175 | 10/1965 | Wonneman | 29—208 |
| 3,260,403 | 7/1966 | Wonneman | 29—211 X |

THOMAS H. EAGER, *Primary Examiner.*